(No Model.)

W. H. CASTLE.
ANIMAL TRAP.

No. 391,118. Patented Oct. 16, 1888.

WITNESSES,

INVENTOR.
W. H. Castle.
By, Edson Bros.
Attorneys.

UNITED STATES PATENT OFFICE.

WILLIAM H. CASTLE, OF GENEVA, OHIO.

ANIMAL-TRAP.

SPECIFICATION forming part of Letters Patent No. 391,118, dated October 16, 1888.

Application filed June 18, 1888. Serial No. 277,408. (No model.)

*To all whom it may concern:*

Be it known that I, WILLIAM H. CASTLE, a citizen of the United States, residing at Geneva, in the county of Ashtabula and State of Ohio, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in animal-traps; and it consists of the peculiar construction and combination of devices, as will be hereinafter fully described and claimed.

The object of my invention is to provide a simple and inexpensive animal-trap which can be quickly and easily set or adjusted for use without directly grasping the jaws of the trap by hand, which, as far as I am aware, is necessary with all the traps heretofore constructed, and during which operation the trap is liable to be "sprung" and injure the hand of the operator.

With my improved trap the operator can set or adjust it for use with entire safety, and the parts of the trap are arranged to compactly fold together within a narrow space, so that it can be conveniently carried or packed for shipment and storage.

Figure 1:
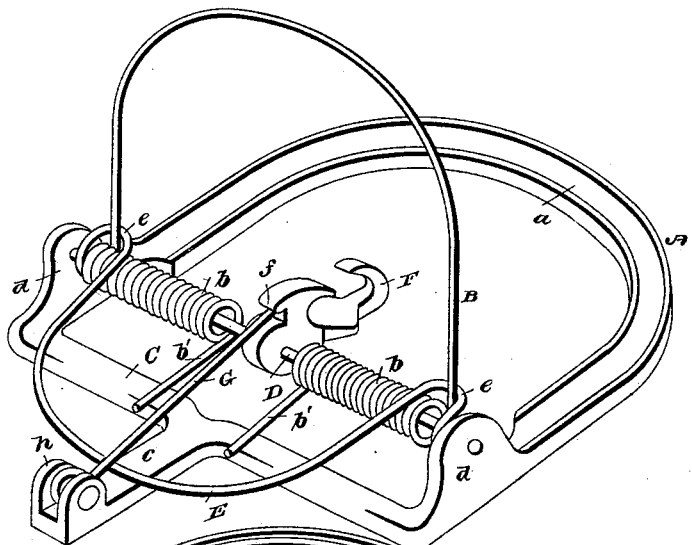
Figure 2:
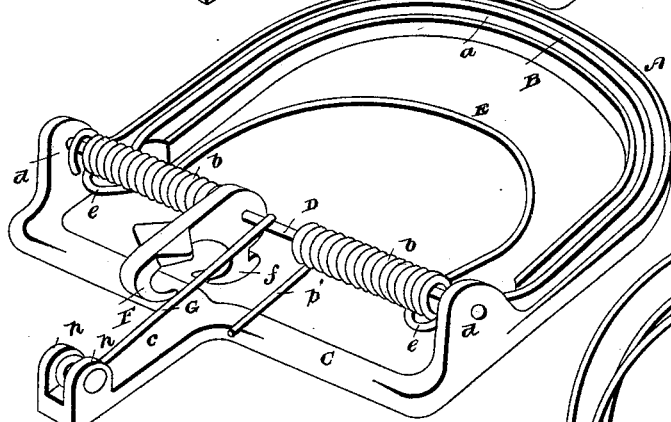
Figure 3:
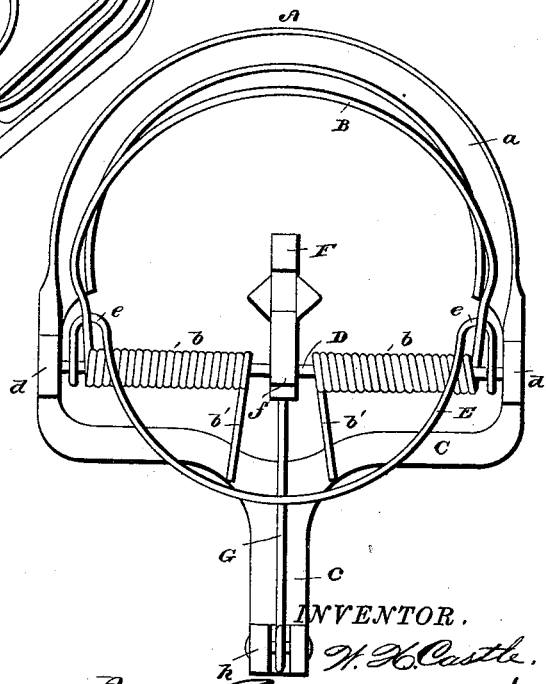

In the accompanying drawings, Figure 1 is a perspective view of an animal-trap constructed in accordance with my invention and adjusted for use. Fig. 2 is a like view showing the trap folded. Fig. 3 is a plan view with the operating bail or lever partly raised to separate the jaws of the trap.

Referring to the drawings, in which like letters of reference denote corresponding parts in all the figures, A designates the base of my improved animal-trap, and B the movable jaw thereof, which is normally forced against the base, the base also serving as one of the jaws. This base A and the movable jaw B are made substantially semicircular in form; but the shape is immaterial and can be varied at pleasure, and the movable jaw is made of spring-wire, while the stationary base is made of cast metal to serve as a support for the jaw and other operative parts of the trap.

The cast-metal base is provided in its upper face with a groove or depression, $a$, which receives the spring-wire jaw B, as indicated in Fig. 3, and when the base is made semicircular, as herein shown and described, the sides thereof are connected by a transverse bar, C, from the middle of which projects a rearward extending arm, $c$, which will be more fully referred to presently.

Vertical lugs $d$ are cast integral with the sides of the base A at points near the transverse bar C thereof, and in these lugs is fitted a supporting shaft or rod, D, on which are hung the jaw B and the bail or lever E for raising said jaw. The ends of the wire jaw B are coiled to form springs $b\ b$, and the extreme ends of the jaw are extended in the opposite direction from the coils $b\ b$, and the jaw B extends from said coils, thereby forming arms $b'\ b'$. The coiled springs of the jaw are fitted on the rod or shaft D between the supporting-lugs $d$, and the arms $b'\ b'$ normally press upon the transverse bar C of the base A to normally close or force the jaw B against the base, as is obvious.

To enable the operator to set the trap with entire safety and without directly grasping the jaw of the trap, I have provided the bail or lever E, which is arranged to be grasped from the rear of the jaw and to elevate the latter away from the base A, in which elevated position it is held by the lever or bail while the trip and bait-hook are adjusted by hand to set the trap. This lever or bail is hung upon the rod or shaft D, and it is provided with short cranks $e$, which are so formed or bent as to take beneath the jaw when the bail is elevated and the jaw depressed. The bail or lever is thus capable of a limited movement on the rod or shaft D without operating the jaw, and it is adapted to fold compactly within the base A, as indicated in Fig. 2.

F is the bait-hook, which is loosely hung on the shaft or rod D between the coils $b$ of the jaw, and on the rear side of this hook is a shoulder or lug, $f$, beneath which takes the free or unconfined end of a trigger, G, which is pivoted at one end between a pair of lugs, $h$, cast integral with the arm $c$ of the base A.

The operation of my improved trap is as follows: To set the trap for use, the bait is placed on the hook F and the lever or bail E elevated until it assumes substantially a vertical position, with the cranks e thereof beneath the hinged spring-pressed jaw B. The bail or lever is now forcibly depressed to assume a horizontal position (indicated in Fig. 1) and elevate the spring-pressed jaw B away from the base, the trigger G now adjusted by hand over the bail or lever, and the free end of said trigger fitted beneath the shoulder on the bait-hook, which thereby holds the bait-hook and jaw B raised in the position shown in Fig. 1. When an attempt is made to pull the bait from the hook F, the trigger is displaced from the shoulder f and releases the bail or lever, which thus permits the jaw B to close and catch the animal between itself and the base.

Changes in the form and proportion of parts and details of construction can be made without departing from the spirit or sacrificing the advantages of my invention. If desired, the jaws A B may be toothed and both may be made of cast metal.

Having thus fully described my invention, what I claim as new, and desire to secure by Letters Patent, is—

1. In an animal-trap, the combination of a base, a spring-pressed jaw connected thereto, a bail or lever having a limited movement on the base and provided with cranks for raising the spring-pressed jaw when pressure is forcibly applied to the bail, a bait-hook, and a trigger, substantially as described.

2. In an animal-trap, the combination of a base, a shaft or rod connected thereto, a spring-controlled jaw hung on the rod or shaft, a bail or lever, also hung on said rod independently of the jaw and having cranks adapted to elevate the jaw, a bait-hook, and a trigger, substantially as described, for the purpose set forth.

In testimony whereof I affix my signature in presence of two witnesses.

WILLIAM H. CASTLE.

Witnesses:
H. W. TURNER,
J. T. TOBEN.